United States Patent
Rijkhof et al.

[11] Patent Number: 5,093,000
[45] Date of Patent: Mar. 3, 1992

[54] FILTRATION APPARATUS

[75] Inventors: Evert J. Rijkhof, Soest; Johannes P.P. Tholen, Bussum, both of Netherlands

[73] Assignee: Esmil Water Systems BV, Diemen, Netherlands

[21] Appl. No.: 600,724

[22] Filed: Oct. 22, 1990

[30] Foreign Application Priority Data

Oct. 25, 1989 [NL] Netherlands .......................... 8902637

[51] Int. Cl.⁵ .............................................. B01D 25/38
[52] U.S. Cl. ............................ 210/333.01; 210/323.1; 210/408; 210/411; 210/416.1
[58] Field of Search ................. 210/323.1, 333.01, 107, 210/108, 408, 411, 416.1

[56] References Cited

U.S. PATENT DOCUMENTS

| | | | |
|---|---|---|---|
| 1,945,839 | 2/1934 | von Maltitz | 210/152 |
| 4,057,501 | 11/1977 | Muller | 210/333.01 |
| 4,297,211 | 10/1981 | Hiesinger et al. | 210/411 |
| 4,462,916 | 7/1984 | Ecabert et al. | 210/411 |
| 4,486,304 | 12/1984 | Neuman et al. | 210/107 |

FOREIGN PATENT DOCUMENTS 1554798 1/1970 Fed. Rep. of Germany .
2088232 6/1982 United Kingdom .

OTHER PUBLICATIONS

Netherlands Patent Application NLA-8802292 Rigkhof.

Primary Examiner—Robert A. Dawson
Assistant Examiner—David Reifsnyder
Attorney, Agent, or Firm—Stevens, Daivs, Miller & Mosher

[57] ABSTRACT

A filtration apparatus for filtering water has a filter cloth which is supported on one side by support means against the pressure applied by water being filtered. During cleaning by reverse flow of water the cloth billows away from said support and cleaning means contact the billowed out filter cloth to clean it. To improve the cleaning effect, the cleaning means comprise a movable plate which is contacted by a region of said billowed out filter cloth during the reverse flow. The plate has at least one aperture at which said reverse flow occurs, and the aperture is moved relative to the filter cloth by movement of the plate.

8 Claims, 2 Drawing Sheets

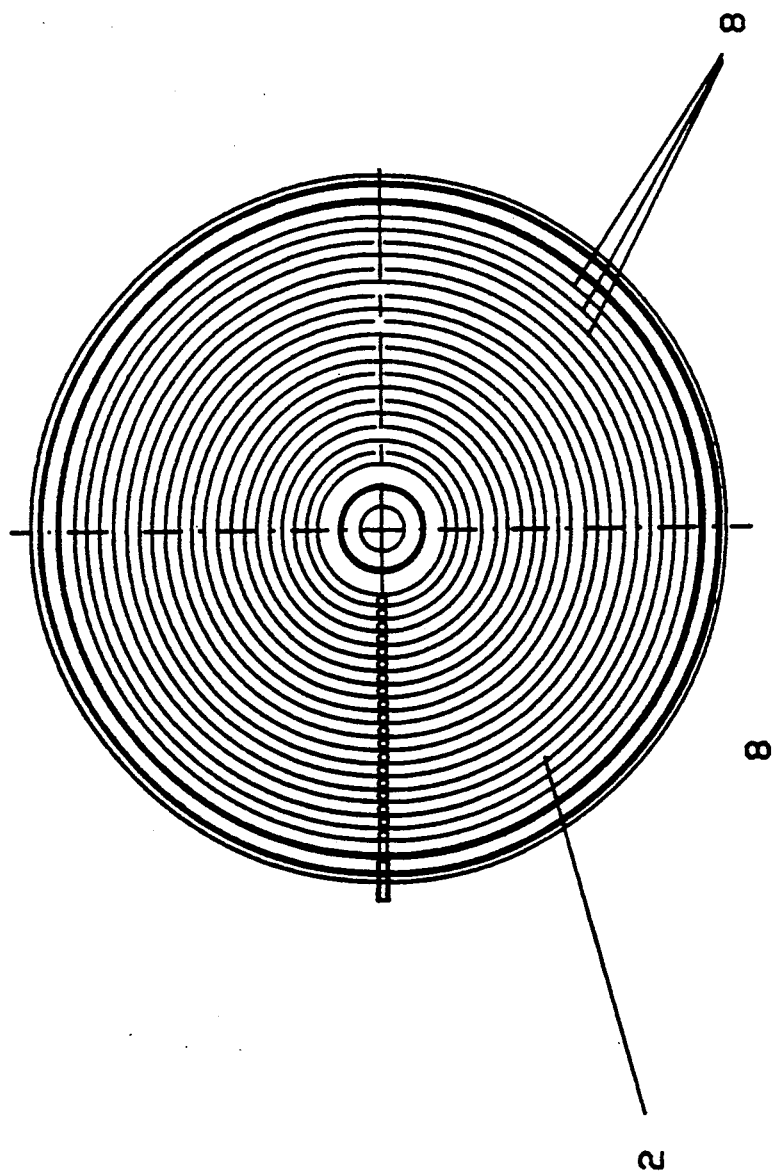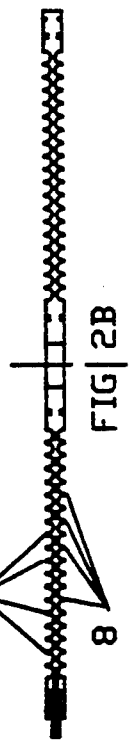
FIG 2A
FIG 2B

FILTRATION APPARATUS

BACKGROUND OF THE INVENTION

1. Field of the Invention

This invention relates to filtration apparatus having a filter cloth, particularly for filtering water containing solid material which collects as a sludge on the cloth. The apparatus may comprise a plurality of filter elements.

2. Description of the Prior Art

NL-A-8802292 describes a filtration system comprising at least one filter element which at least on one side is provided with a filter cloth through which water to be filtered is sucked. The filter cloth is provided on its downstream side in the normal filtration direction with means for supporting it against the pressure difference. The filter cloth is provided on its upstream side with means for removing the sludge collected on the filter cloth. The sludge collected on the filter cloth is removed in the course of time by reversal of the direction of flow of water so that the filter cloth billows out from the support means, whereupon a scraper is moved along the billowed out filter cloth to remove the sludge.

A problem with this known apparatus is that the reverse flow through the filter cloth only leads to local loosening of the sludge layer. This is believed to occur because the reverse flow finds the path of least resistance, so that if locally some sludge is loosened, there is insufficient pressure remaining for removing the sludge from the filter cloth elsewhere as well.

SUMMARY OF THE INVENTION

It is an object of the invention to solve this problem. At the same time other advantages which will be described below may be achieved.

The filtration apparatus in accordance with the invention is characterised in that the means for removing sludge collected on the filter cloth comprises a movable member preferably plate-shaped, which is provided with at least one aperture. The member contacts the filter cloth which billows away from its support means during the reverse flow. The aperture in the movable member defines a position on the filter cloth at which the loosening of the sludge is forced to occur. The sludge may be removed from the entire filter cloth by moving the member over the filter cloth so that the aperture or apertures in the plate pass over the entire filter cloth.

After the sludge has been loosened, it may for example sink down into a settling tank in which the filtration apparatus is suspended or it may be sucked away. After cleaning the filtration system may be reset to normal operation in which the contamination to be removed from the influent water adheres to the filter cloth and in the course of time again forms a sludge layer for removal.

It is mentioned that the idea of applying suction via a rotating member to achieve reverse cleaning flow of a filter is known, e.g. from DE-A-1554798 and U.S. Pat. No. A-4486304 which apply it to the filtration of plastics material being processed, and also from GB-A-2088232 where the filtered liquid is unspecified. In all these disclosures, the filter is a rigid element. The present invention in contrast applies a movable apertured cleaning member to a billowed out filter cloth.

It has been found to be an advantage to make the filtration system in accordance with the invention in such a way that the means for sludge removal further comprise suction means for discharging the sludge, which is connected to the movable member in such a way that the suction is applied to the aperture or apertures. This prevents the sludge held in suspension in the liquid from being sucked back onto the filter cloth after re-setting to normal operation. In this way, with this preferred embodiment of the filtration system in accordance with the invention, the normal operating time is extended compared with the filtration system in accordance with the current state of the art.

Preferably, during sludge removal, the suction means can apply a difference in pressure across the filter cloth which is in the range 1-10 m water column. This improves the speed with which the filter cloth is cleaned and is possible because, during the reverse flow of the water through the filter cloth, the billowed out filter cloth finds support against the movable member which prevents damage to the filter cloth.

A simple embodiment is that in which the filtration apparatus is made rotationally symmetrical and the movable member can be rotated and the aperture is slot-shaped. Preferably the plate is also at least part of a circle in shape and the slot is directed radially. In that case the movable member may be driven by means of an electric motor or another suitable rotating drive and the entire filter cloth may be cleaned in one turn of the movable member by the radially directed slot. Since no mechanism is required for converting movement from rotary to linear, there is less susceptibility to defects of the filtration apparatus than with an embodiment with rectangular filter cloths in which a plate is used which has to be moved linearly along the filter cloth.

Preferably the suction means mentioned above is coupled to the movable member via a conduit in a central drive member for rotating the movable member.

Besides the advantages described above, the filtration apparatus in accordance with the invention is capable of providing long-lasting, trouble-free operation. Particularly, it is possible to avoid silting up and bacterial growth in the sludge layer on the filter cloth, which necessitates regular stripping down and thorough cleaning of a filtration system.

BRIEF INTRODUCTION OF THE DRAWINGS

The invention will now be illustrated by a non-limitative embodiment, described with reference to the accompanying drawings, in which:

FIG. 1 shows a cross-section view of a filtration apparatus in accordance with the invention, FIG. 2A shows a support member of a filter element of the filtration apparatus of FIG. 1 in top view, and FIG. 2B shows a cross-section of the support member which is shown in FIG. 2A.

DESCRIPTION OF THE PREFERRED EMBODIMENT

Figure 1:
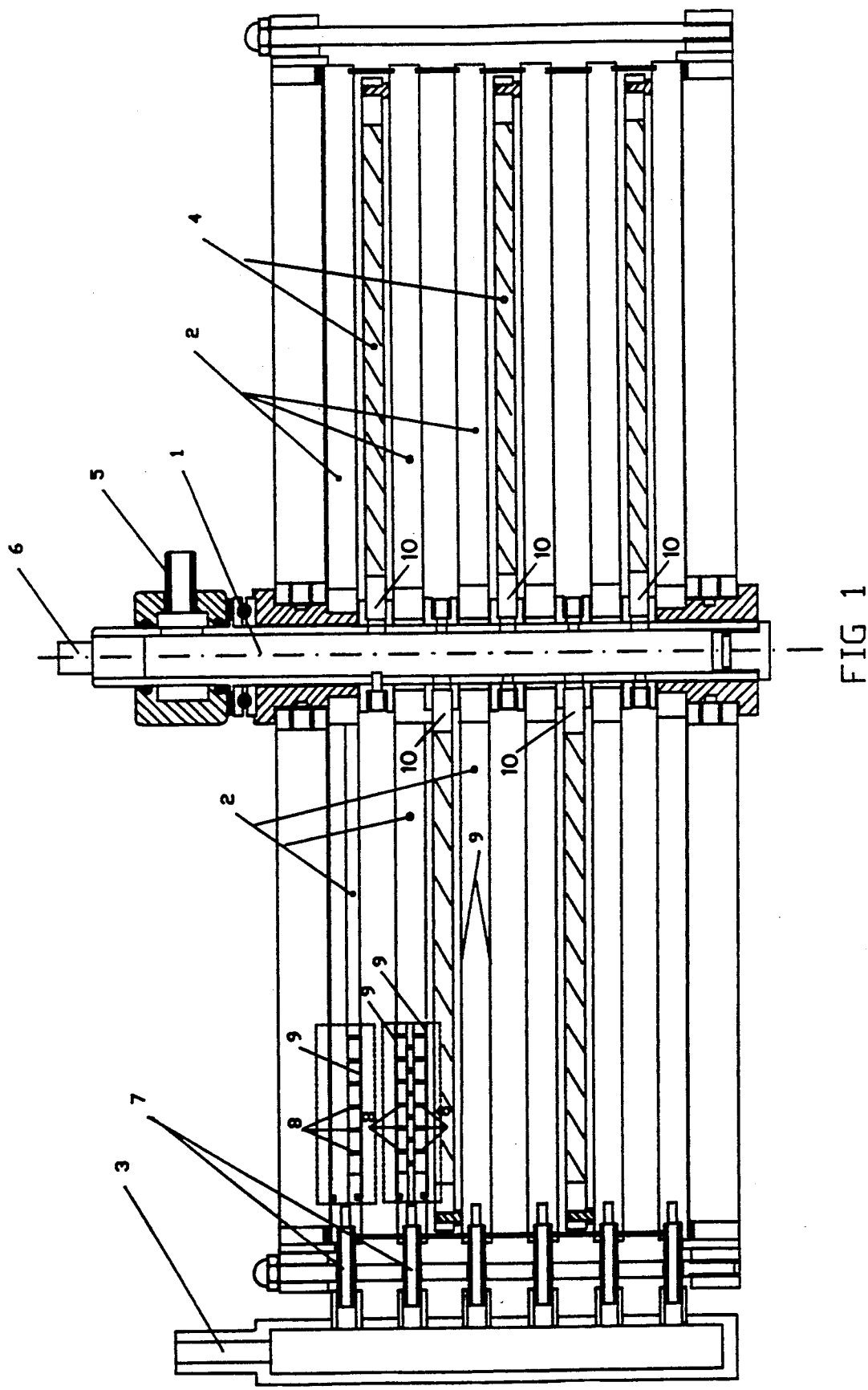

The filtration apparatus shown in FIG. 1 comprises a central discharge and drive tube 1, a plurality of filter elements 2 equipped with filter cloths 9, a discharge pipe 3 and rotating cleaning plates 4. These cleaning plates 4 may have the shape of for example, a complete circle of the size of a filter cloth 9, or part of such a circle. The filter elements are arranged in a tank filled with water to be filtered. This water, the influent, is sucked through the filter cloths 9 fitted on the filter elements 2 and from the inside of the filter elements 2 is discharged as cleaned effluent via coupling pieces 7 towards discharge pipe 3. To this end an extraction pump (not shown in drawing) is connected to the discharge pipe 3. The filter cloth 9 is supported against the pressure difference across it by ribs 8 which are provided on each filter element 2, seen also in FIGS. 2A and 2B.

Each plate 4 is semi-circular in plan view and has flat opposite faces which provide support surfaces for the filter cloths 9 above and below when the cloths billow out during reverse water flow for cleaning. During filtration, the cloths 9 are spaced from the plates 4, thereby allowing the water being filtered to reach the cloths. In the opposite faces of the plate 4 there are elongate radial grooves or recesses (not shown) which form slots or apertures in these surfaces at which the sludge is sucked from the cloth during cleaning. The grooves or recesses are connected by passages in the plate 4 to connections 10 leading into the tube 1. The size of the plate can be altered Preferably it is at least 40% of the area of the cloth 9. At its periphery the plate 4 is supported by a sliding shoe.

On the central discharge and drive tube 1 a motor is connected on the drive end 6 for rotating the tube 1, and on a branch connection 5 a suction unit (not shown in the drawing) is connected, the function of which is now explained.

After a sludge layer has accumulated on the filter cloths 9 it has to be removed. To this end the pumping direction of the pump unit which is connected to discharge pipe 3 is reversed, so that cleaned effluent is forced in the opposite direction through the filter cloth 9. This makes the filter cloth 9 billow out away from the ribs 8 and the sludge layer present on it breaks.

On the central discharge and drive tube 1 are mounted the rotating plates 4 which are rotated by turning the tube 1 and thus move along the billowed out cloths 9 of the filter elements 2. The cloths thus contact and are supported by the plates 4 during this reverse flow. The rotating plates 4 are each provided with a radially directed slot on each side as described in the drawing. This slot in each plate 4 is connected inside of the plate 4 and thus to the central discharge and drive tube 1 via the connections 10 in the extraction tube 1. As the discharge tube 1 rotates the suction unit coupled to branch connection 5 of the discharge tube 1 is switched on, so that liquid and the sludge broken loose from the filter cloths 9 via the openings in the respective rotating plates 4 is extracted via connections 10 and the discharge tube 1, in order to be removed from the tank. Consequently there is no settling of the sludge.

The rotating plates 4 may also be provided with a scraper to encourage the sludge to loosen from the filter cloths 9. However, this is not essential.

Because the rotating plates 4 support the filter cloths 9 as they billow out, the suction pressure imposed by the suction unit coupled to the branch connection 5, may be set at a very high value, for example between 1 and 10 m water column. As a result of this, the time needed for cleaning the filter cloths 9 and for removing the sludge caked on them is short and only slightly dependent on the period for which the filtration system was running in normal operation. For example, in the case of a continous filtration operation time of approx. 50–100 hours it has been found that sludge removal is sufficient for making the filtration system suitable for a fresh period of operation of 50–100 hours. The effectiveness of this filtration system in accordance with the invention is therefore very high and may be improved by a factor of at least five compared with a known filtration system in accordance with the current state of the art.

What is claimed is:

1. Filtration apparatus for filtering water, comprising
    a filter cloth for filtering said water passing therethrough in a first flow direction,
    support means for said filter cloth at the downstream side thereof in said first flow direction,
    means for causing reverse flow through said filter cloth in a second flow direction opposite to said first flow direction, in order to clean said filter cloth by removal of material collected on it during filtration, and
    at least one movable cleaning member having a face arranged at the upstream side of said filter cloth and spaced therefrom during said first flow direction so that during reverse flow said filter cloth billows out to contact said face, said face having at least one aperture through which said reverse flow occurs, said movable member being movable along said filter cloth during said reverse flow.

2. Filtration apparatus according to claim 1 in which said movable cleaning member is a plate.

3. Filtration apparatus according to claim 1 including means for applying suction to said aperture so as to suck water through said filter cloth during cleaning.

4. Filtration apparatus according to claim 3 wherein said suction means is adapted to apply a pressure difference in the range of 1 to 10 m water column across said filter cloth, during cleaning.

5. Filtration apparatus according to claim 3 wherein said means for applying suction comprises a conduit extending along a drive member connected to said cleaning member to move it.

6. Filtration apparatus according to claim 1 wherein said movable cleaning member is rotated about an axis during cleaning, and said aperture is a slot.

7. Filtration apparatus according to claim 6 wherein said cleaning member is at least part circular in shape and said slot extends radially relative to said axis.

8. In a filtration apparatus for filtering water having a filter cloth which is supported on one side by support means against the pressure applied by water being filtered, and which during cleaning by reverse flow of water billows away from said support means, there being cleaning means for contacting the billowed out filter cloth to clean it, the improvement that said cleaning means comprise a movable plate which is contacted by a region of said billowed out filter cloth during the reverse flow, said plate having at least one aperture through which said reverse flow occurs, said aperture being moved relative to the filter cloth by movement of the plate.

* * * * *